(12) United States Patent
Filsegger et al.

(10) Patent No.: US 11,186,355 B2
(45) Date of Patent: Nov. 30, 2021

(54) MORPHING CONTROL SURFACE

(71) Applicant: FACC AG, Ried im Innkreis (AT)

(72) Inventors: Hermann Filsegger, Ried im Innkreis (AT); Walter Stephan, Ried im Innkreis (AT)

(73) Assignee: FACC AG, Ried im Innkreis (AT)

( * ) Notice: Subject to any disclaimer, the term of this patent is extended or adjusted under 35 U.S.C. 154(b) by 646 days.

(21) Appl. No.: 15/781,952

(22) PCT Filed: Apr. 28, 2017

(86) PCT No.: PCT/AT2017/060112
§ 371 (c)(1),
(2) Date: Jun. 6, 2018

(87) PCT Pub. No.: WO2017/185121
PCT Pub. Date: Nov. 2, 2017

(65) Prior Publication Data
US 2018/0362148 A1    Dec. 20, 2018

(30) Foreign Application Priority Data

Apr. 29, 2016 (AT) .............................. A 50383/2016

(51) Int. Cl.
*B64C 3/50* (2006.01)
*B64C 9/02* (2006.01)
(Continued)

(52) U.S. Cl.
CPC .................. *B64C 3/50* (2013.01); *B64C 9/02* (2013.01); *B64C 23/076* (2017.05); *B64C 9/08* (2013.01);
(Continued)

(58) Field of Classification Search
CPC .... B64C 3/50; B64C 9/02; B64C 9/04; B64C 9/06; B64C 9/08; B64C 23/076; B64C 23/072
See application file for complete search history.

(56) References Cited

U.S. PATENT DOCUMENTS 3,478,987 A    11/1969   Dorand
5,947,422 A     9/1999   Wille
(Continued)

FOREIGN PATENT DOCUMENTS

CN       104670478 A    6/2015
DE        3643157 A1    7/1987
(Continued)

OTHER PUBLICATIONS

ISA European Patent Office, International Search Report Issued in Application No. PCT/AT2017/060112, dated Aug. 2, 2017, WIPO, 6 pages.
(Continued)

*Primary Examiner* — Philip J Bonzell
(74) *Attorney, Agent, or Firm* — McCoy Russell LLP (57) ABSTRACT

The invention relates to an aerodynamic profiled body for an aircraft, in particular a winglet, comprising a front profiled element having a profile front edge, a rear profiled element having a profile rear edge, and an adjusting unit, which connects the front profiled element to the rear profiled element and by means of which the rear profiled element can be moved in relation to the front profiled element, wherein the adjusting unit has a front mounting device connected to the front profiled element, a rear mounting device connected to the rear profiled element, and a force-transmitting device, which connects the front mounting device and the rear mounting device to each other.

15 Claims, 8 Drawing Sheets

(51) Int. Cl.
    *B64C 23/06* (2006.01)
    *B64C 9/08* (2006.01)
(52) U.S. Cl.
    CPC ............... *Y02T 50/10* (2013.01); *Y02T 50/30* (2013.01); *Y02T 50/40* (2013.01)

(56) References Cited

U.S. PATENT DOCUMENTS

| | | | |
|---|---|---|---|
| 6,474,945 B1* | 11/2002 | Nakasato | B64C 27/615 |
| | | | 416/23 |
| 7,975,965 B2 | 7/2011 | Ackermann et al. | |
| 8,746,625 B2 | 6/2014 | Recksiek et al. | |
| 9,604,716 B2 | 3/2017 | Casse | |
| 2002/0100839 A1 | 8/2002 | Miller et al. | |
| 2005/0133672 A1 | 6/2005 | Irving et al. | |
| 2009/0200431 A1 | 8/2009 | Konings et al. | |
| 2011/0253832 A1* | 10/2011 | Wildman | B64C 9/22 |
| | | | 244/99.13 |
| 2012/0091283 A1* | 4/2012 | Uchida | B64C 9/02 |
| | | | 244/213 |
| 2013/0001367 A1* | 1/2013 | Boer | B64C 23/072 |
| | | | 244/199.3 |
| 2015/0166171 A1 | 6/2015 | Casse | |
| 2016/0009378 A1* | 1/2016 | Guida | B64C 23/076 |
| | | | 244/199.4 |
| 2016/0244153 A1* | 8/2016 | McMahon | B64C 3/38 |
| 2016/0264232 A1* | 9/2016 | Briancourt | B64C 23/072 |

FOREIGN PATENT DOCUMENTS

| | | |
|---|---|---|
| DE | 19503051 A1 | 8/1996 |
| DE | 102009053126 A1 | 5/2011 |
| EP | 0230681 B1 | 1/1990 |
| EP | 1205383 A2 | 5/2002 |
| EP | 1047593 B1 | 11/2006 |
| FR | 3014410 A1 | 6/2015 |
| GB | 1174497 A | 12/1969 |
| GN | 101098815 A | 1/2008 |
| GN | 102791574 A | 11/2012 |
| JP | 2001080589 A | 3/2001 |

OTHER PUBLICATIONS

China National Intellectual Property Administration, Office Action and Search Report Issued in Application No. 201780006456.0, dated Jan. 5, 2021, 16 pages.

China National Intellectual Property Administration, Office Action and Search Report Issued in Application No. 201780006456.0, dated Aug. 23, 2021, 15 pages.

* cited by examiner

MORPHING CONTROL SURFACE

CROSS-REFERENCE TO RELATED APPLICATIONS

The present application is a U.S. National Phase of International Patent Application Serial No. PCT/AT2017/060112 entitled "AERODYNAMIC PROFILED BODY FOR AN AIRCRAFT," filed on Apr. 28, 2017. International Patent Application Serial No. PCT/AT2017/060112 claims priority to Austrian Patent Application No. A 50383/2016, filed on Apr. 29, 2016. The entire contents of each of the above-cited applications are hereby incorporated by reference in their entirety for all purposes.

TECHNICAL FIELD

The invention relates to an aerodynamic profiled body for an aircraft, particularly a winglet, which comprises a front profiled element with a profile leading edge and a rear profiled element with a profile trailing edge, as well as to an aircraft with such an aerodynamic profiled body.

BACKGROUND

Various aerodynamic profiled bodies are used in aircraft, wherein one common aspect of these aerodynamic profiled bodies is an outside surface in airflow. Aerodynamic profiled bodies are realized, for example, in the form of so-called winglets, which are less commonly referred to as wing end plates and mounted on the free ends of the aircraft wings in the form of attachments. Winglets reduce the aerodynamic drag of the wings. The winglets are available in various designs.

The geometry of profiled bodies significantly influences the fuel consumption of the aircraft just like their weight. In addition, the noise development of the aircraft depends on the turbulences on the profiled bodies. In the past, it was already attempted to make arrangements for adapting the geometry of the profiled bodies in-flight in order to take into account the prevailing flight conditions, particularly wind and weather.

For example, EP 1 047 593 B1 proposes an aircraft wing, in which devices for varying the cross-sectional profile are provided on the leading edge and on the trailing edge. To this end, a flexible outer frame is provided and covered with a flexible skin. An actuator is provided on the rear section of the wing profile and acts upon a flexible connecting structure. The connecting structure features compressible S-shaped elements that are connected to the flexible outer frame. In this way, the profile of the trailing edge can be adapted. Another actuator is provided on the front section of the wing profile and exerts a radial force upon a connecting structure, wherein said radial force is transmitted to the flexible frame. The geometry of the leading edge can thereby also be adapted.

However, this design has the disadvantage that the outer frame has to be realized in an altogether flexible fashion in order to allow the geometric adaptation. Another disadvantage can be seen in that the arrangement of separate actuators on the leading edge and the trailing edge significantly increases the weight of the profile.

The present invention is therefore based on the objective of diminishing or eliminating at least individual disadvantages of the prior art. Consequently, the invention particularly aims to enable an aerodynamic profiled body and an aircraft to adapt the profile geometry in-flight with constructively simple means and without significantly affecting the airflow around the profile.

The invention is characterized by an adjusting unit that connects the front profiled element to the rear profiled element and by means of which the rear profiled element is adjustable relative to the front profiled element, wherein the adjusting unit comprises a front mounting device that is connected to the front profiled element, a rear mounting device that is connected to the rear profiled element and a force-transmitting device that connects the front mounting device and the rear mounting device to one another.

The adjusting unit, by means of which the profile geometry can be adapted in-flight, is accordingly arranged between the front profiled element and the rear profiled element. This makes it possible, for example, to react to the current wind and weather conditions so as to respectively adjust an advantageous profile geometry. The adjusting unit is particularly designed for adapting the progression of the mean or center line ("camber") of the profiled body. In the inventive construction, the front profiled element and the rear profiled element each may be essentially rigid. In the context of this disclosure, this means that the front and the rear profiled element are respectively subject to normal elastic deformations under a mechanical load, but no defined change in shape of the front or rear profiled element takes place for adapting the profile geometry. In contrast, the shape of the adjusting unit between the front and the rear profiled element can be changed in order to adapt the profile geometry. To this end, the adjusting unit respectively comprises at least one front mounting device on the front profiled element and one rear mounting device on the rear profiled element. The angle of the rear mounting device relative to the front mounting device can be varied in order to adapt the profile geometry. The maximum angular variation between the front mounting device and the rear mounting device preferably amounts to at least several degrees. The force transmission between the rear profiled element and the front profiled element is realized with the force-transmitting device, by means of which a torque is applied to one of the mounting devices, particularly the rear mounting device.

The aerodynamic profiled body is preferably a winglet that can be arranged on the end of a wing. However, the inventive adjusting unit can also be used on a control surface element, particularly a rudder or a spoiler.

The geometry of the aerodynamic profiled body can be adapted with the aid of the adjusting unit, wherein an angle of the rear profiled element relative to the front profiled element particularly can be adjusted by several degrees, e.g. 10°, relative to a normal position. In the case of a winglet, this makes it possible to react to changing environmental conditions, e.g. wind gusts, by varying the profile geometry. In this way, the flight characteristics of a correspondingly equipped aircraft can be advantageously optimized. The profile geometry adaptation of the profiled body particularly makes it possible to achieve fuel savings. Depending on the application, the in-flight noise development can also be reduced.

According to a particularly preferred embodiment, the force-transmitting device comprises an elastically deformable leaf spring element. The arrangement of the leaf spring element advantageously defines a bending line between the front and the rear profiled element. In this way, the cross-sectional profile can essentially extend continuously from the profile leading edge to the profile trailing edge. Such an embodiment has significant advantages over the prior art, in which a sharp bend, i.e. a discontinuous transition, was frequently provided between the movable and the stationary profiled element. The elastic deformation of the leaf spring element in the activated state of the adjusting unit generates a spring tension that causes a high flexural strength of the connection between the front and the rear profiled element. It is furthermore advantageous that the mechanical properties of the leaf spring element can be very precisely adjusted.

In the context of this disclosure, the term leaf spring element refers to a flexible element, the extension of which along a principal plane being several times greater than perpendicular thereto, particularly by a multiple.

According to a preferred embodiment, the adjusting unit comprises a drive, particularly a linear drive, for transmitting a torque to the force-transmitting device. The drive is preferably accommodated in the front profiled element. The linear drive may be realized in the form of a hydraulic or pneumatic cylinder-piston drive.

An aerodynamic profiled body with a leaf spring element and a drive for transmitting a torque to the leaf spring element is neither known from the prior art nor suggested thereby.

DE 10 2009 053126 A1 describes an adjusting device for regulating flaps that are pivotably mounted on an aircraft wing. An actuator is coupled to a drive unit by means of a rotary driveshaft in order to transmit a torque to the regulating flap. The torque transmission is realized by connecting the actuator to a connecting device, which in turn is coupled to the regulating flap, by means of a coupling device. The angle of the regulating flap relative to the wing is therefore varied due to a rotation of the actuator. The actuator is arranged on the wing and connected to the coupling device by means of a first joint, wherein said coupling device is in turn connected to the regulating flap or the connecting device by means of a second joint.

EP 0230681 A2 (DE 3643157 A1) describes a different type of device for pivoting a slat that is arranged on the leading edge of an aircraft wing. The slat essentially can be arranged in three positions: retracted (FIG. 1), extended (FIG. 3), as well as extended and pivoted (FIG. 6). The changeover between the first position (FIG. 1) and the second position (FIG. 3) is realized due to a motion of the slat along a main carrier rail, wherein this motion is driven by a rotary actuating arrangement. In this case, the slat is moved forward (in the direction of flight) and a downward. A spring pretensioning device is designed for holding the slat in this position with the aid of a certain spring force. A pivoting motion of the slat takes place when the aerodynamic force becomes greater than the spring force due to the inflowing air, wherein the slat is additionally pivoted downward in this case such that the curvature of the wing increases. The motion/pivoting motion of the slat is accordingly realized mechanically (rotary actuating arrangement) in a first step and due to the fact that the aerodynamic forces exceed the spring force of the spring pretensioning device in a second step.

The spring pretensioning device comprises layered leaf springs. However, the leaf springs in EP 0230681 A2 (DE 3643157 A1) are designed for a completely different purpose and therefore also exhibit numerous constructive differences. In any case, EP 0230681 A2 (DE 3643157 A1) lacks the drive provided in the above-described embodiment for transmitting a torque to the force-transmitting device. In EP 0230681 A2 (DE 3643157 A1), the leaf spring assembly is merely deformed passively—by the inflowing air.

Consequently, not even a synopsis of DE 10 2009 053126 A1 with EP 0230681 A2 (DE 3643157 A1) can lead to the above-described aerodynamic profiled body, in which a leaf spring element can be actively adjusted between the front and rear mounting devices by means of a drive.

DE 19503051 A1 discloses a linear drive for adjusting a wing flap that comprises an input part and an output part coupled thereto. If the motion of the wing flap is blocked due to external influences and a certain limiting value for the force transmitted to the wing flap is exceeded, the input part is decoupled from the output part such that the force transmission is interrupted. Consequently, DE 19503051 A1 pertains to a safety device of sorts for a linear drive unit (as an alternative to torque limiters or predetermined breaking points).

The adjusting unit is preferably capable of deforming the leaf spring element in a direction essentially perpendicular to the principal plane of the leaf spring element. The adjusting unit between the front and the rear profiled element can be actuated in order to adapt the profile geometry of the aerodynamic profiled body to the prevailing ambient conditions. The leaf spring element is bent open in a direction essentially perpendicular to its principal plane due to the actuation of the adjusting unit. In the bent-open state of the leaf spring element, an essentially uniform force transmission between the front and the rear mounting device is achieved along the principal plane of the leaf spring element.

In order to achieve an effective force transmission between the front and the rear profiled element, it is advantageous if in a normal position of the rear profiled element the leaf spring element is essentially arranged plane relative to the front profiled element, wherein in an active position of the rear profiled element the leaf spring element is essentially bent open in a direction perpendicular to the principal plane of the leaf spring element.

According to a particularly preferred embodiment, the leaf spring element is essentially arranged centrally between a profile upper side and a profile underside. Accordingly, the cross section of the leaf spring element is in this embodiment essentially arranged along the profile center line, which is frequently also referred to as mean line or curvature line. The leaf spring element defines a bending line between the front profiled element and the rear profiled element. Savings in the kerosene consumption, as well as a reduced noise development, can be advantageously achieved with this embodiment.

According to a preferred embodiment, the leaf spring element is made of fiber-reinforced plastic, particularly of carbon fiber-reinforced plastic. This embodiment is characterized by a high flexural strength, a precisely defined force path, little maintenance effort and a low weight.

In order to fix the leaf spring element on the front and the rear mounting device, it is advantageous if the front mounting device comprises an elongate recess for receiving one end of the leaf spring element and the rear mounting device comprises an elongate recess for receiving the other end of the leaf spring element.

In order to ensure the force transmission on longer profiled bodies, it is preferred to provide two front mounting devices on the front profiled element and two rear mounting devices on the rear profiled element, wherein a force-transmitting device is respectively arranged between each front mounting device and rear mounting device. Depending on the embodiment, however, it would also be possible to provide a greater number of force transmission points, which respectively comprise a front mounting device, a rear mounting device and a force-transmitting device.

With respect to a constructively simple embodiment, in which the number of parts and the weight are reduced, it is advantageous if the drive is connected to the two force-transmitting devices by means of a fork element. The fork element may comprise multiple recesses in order to reduce the weight of the adjusting unit.

According to a preferred embodiment, the force-transmitting device comprises a lever mechanism, which is respectively connected to the front mounting device and the rear mounting device, for transmitting a torque to the front or the rear mounting device. The torque is preferably transmitted to the rear mounting device in order to adjust the rear profiled element relative to the front profiled element. However, the lever mechanism may alternatively also be designed for transmitting a torque to the front mounting device. In both embodiments, a torque is applied to the lever mechanism, which in turn causes an adjustment of the relative angular position between the rear mounting device on the rear profiled element and the front mounting device on the front profiled element.

In order to adapt the profile geometry of the aerodynamic profiled body, it is advantageous if the drive is connected to the lever mechanism, particularly by means of the fork element.

According to a particularly preferred embodiment, the lever mechanism comprises a first connecting arm and a second connecting arm, the first ends of which are connected to the front or rear mounting device in an articulated fashion and the other ends of which are connected to the ends of a bearing lever in an articulated fashion, wherein said bearing lever is respectively mounted on the rear or the front mounting device in an articulated fashion. In other words, the connections may be made to enable components to move with respect to each other or articulate. Depending on the embodiment, the bearing lever is pivotably mounted on the front or on the rear mounting device by means of a stationary joint. The ends of the bearing lever are coupled to the first and the second connecting arm, which are mounted on the opposite mounting device, i.e. on the rear or on the front mounting device, by means of stationary joints. When the adjusting unit is actuated, the bearing lever is pivoted about its stationary joint, wherein the joints of the first and the second connecting arm on the bearing lever are displaced in opposite directions. Depending on the pivoting direction of the bearing lever, a compressive force is applied to the respective mounting device with the first connecting arm and a tensile force is applied to the respective mounting device by the second connecting arm (or vice versa). In this way, a torque is applied to this mounting device and causes a change in the angular position of the rear profiled element relative to the front profiled element.

In order to transmit a force to the lever mechanism, it is advantageous if the drive engages on the articulated connection between the first connecting arm and the bearing lever, particularly by means of the fork element.

In order to allow the transmission of a torque between the front and the rear mounting device, it is advantageous if the respective articulated connection between the bearing lever and the rear or front mounting device is essentially arranged in the principal plane of the leaf spring element.

In order to ensure that the profile geometry of the aerodynamic profiled body is respectively disturbed as little as possible or not at all due to the arrangement of the adjusting unit, it is advantageous if the adjusting unit comprises a housing with an upper outside surface that essentially ends flush with the profile upper side and a lower outside surface that essentially ends flush with the profile underside. The housing may be elastically deformable on the upper or lower outside surface in order to compensate deformations when the adjusting unit is actuated. The housing may alternatively be realized with essentially rigid outside surfaces, wherein the outside surfaces can respectively slide underneath the profile upper side or profile underside of the front and the rear profiled element in this case. Furthermore, the aerodynamic profiled body may be covered with a flexible film that, however, has a sufficient inherent rigidity as it is generally known from the prior art.

In order to simplify the repair and maintenance of the aerodynamic profiled body, it is advantageous if the adjusting unit is separably connected to the front profiled element and the rear profiled element. This particularly means that the housing of the adjusting unit is not realized integrally with the front or the rear profiled element. The front mounting device is preferably mounted on the rear side of the front profiled element. The rear mounting device is mounted on the front side of the rear profiled element.

The invention is described in greater detail below with reference to a preferred exemplary embodiment, but it should be clear that the invention is by no means limited to this embodiment.

The drawings show an aerodynamic profiled body 1, which is realized in the form of a winglet in this embodiment.

DETAILED DESCRIPTION OF FIGURES

According to FIGS. 1-5, the profiled body 1 comprises a front profiled element 2, which is immovably arranged on the aircraft in the intended operational state of the profiled body 1. The profiled body 1 also comprises a rear profiled element 3, which is movably arranged relative to the front profiled element 2 in the intended operational state of the profiled body 1. The front profiled element 2 has a front profile upper side 2a in airflow and a front profile underside 2b and the rear profiled element 3 has a rear profile upper side 3a in airflow and a rear profile underside 3b. A profile leading edge 4a is formed on the front profiled element 2 and a profile trailing edge 5a is formed on the rear profiled element 3. In the embodiment shown, the front profiled element 2 and the rear profiled element 3 are arranged in such a way that the rear profiled element 3 has an additional profile leading edge 4b, which adjoins the profile leading edge 4 of the front profiled element 2, and the front profiled element 2 has an additional profile trailing edge 5b, which adjoins the profile trailing edge 5 of the rear profiled element 3.

FIGS. 1-5 show that an adjusting unit 7 is arranged between the front profiled element 2 and the rear profiled element 3, wherein the rear profiled element 3 can be adjusted relative to the front profiled element 2 by means of said adjusting unit. In the case of the winglet shown, the adjusting unit 7 extends angular to the profile leading edge 4a, 4b and to the profile trailing edge 5a, 5b, in particular in a direction essentially perpendicular to the principal plane of the (not-shown) wing. The adjusting unit 7 comprises at least one front mounting device 8, which is connected to the front profiled element 2, and one rear mounting device 9, which is connected to the rear profiled element 3. The front mounting device 8 is immovably mounted on the front profiled element 2 and the rear mounting device 9 is movably mounted on the rear profiled element 3. In the embodiment shown, two front mounting devices 8 are provided on the front profiled element 2 and two rear mounting devices 8 are provided on the rear profiled element 3, wherein the two front and the two rear mounting devices are respectively spaced apart from one another in the longitudinal direction of the profiled body 1. In addition, a force-transmitting device 10 is respectively arranged between each front mounting device 8 and rear mounting device 9. The adjusting unit 7 is respectively connected separably to the front profiled element 2 and the rear profiled element 3 in a non-inseparable fashion.

FIGS. 1-5 also show that each force-transmitting device 10 comprises a flexible leaf spring element 11 that can be elastically deformed in a direction essentially perpendicular to the principal plane of the leaf spring element 11. The leaf spring element 11 is essentially arranged centrally between a profile upper side and a profile underside. The leaf spring element 11 is made of fiber-reinforced plastic, particularly of carbon fiber-reinforced plastic. The front mounting device 8 comprises an elongate recess for receiving one end of the leaf spring element 11 and the rear mounting device 9 comprises a corresponding elongate recess for receiving the other end of the leaf spring element 11. In this way, the ends of the leaf spring element 11 are clamped between the mounting devices. The leaf spring element 11 is freely flexural between the fixing points on its ends.

In addition, FIGS. 1-5 show that a drive 12 is provided for transmitting a torque to the force-transmitting device 10, wherein the drive is realized in the form of an individual linear cylinder-piston drive in the embodiment shown. The drive 12 is mounted on a first mounting rail 13, on which one of the front mounting devices 8 is also supported. In addition, a second mounting rail 14 is provided, on which the other front mounting device 8 is supported. Accordingly, one front mounting device 8 is connected to the first mounting rail 13 and the other front mounting device 13 is connected to the second mounting rail 14. The drive 12 is connected to the two force-transmitting devices 10 by means of a rigid fork element 15. In the embodiment shown, the drive 12 essentially engages centrally on the fork element 15.

FIGS. 1-5 furthermore show that each force-transmitting device 10 comprises a lever mechanism 16, which is respectively connected to the front mounting device 8 and the rear mounting device 9, in order to transmit a torque to the rear mounting devices 9. The drive 12 is connected to the lever mechanism 16 by means of the fork element 15. In the embodiment shown, the lever mechanism 16 features a first connecting arm 17 and a second connecting arm 18. The first ends of the first connecting arm 17 and the second connecting arm 18 are connected to the rear mounting device 9 in an articulated fashion. The other ends of the first connecting arm 17 and the second connecting arm 18 are connected to the ends of a bearing lever 19 in an articulated fashion, wherein said bearing lever is mounted on the front mounting device 8 by means of a stationary joint 20 (referred to the front mounting device 8). The drive 12 engages on the fork element 15 such that the fork element 15 can be displaced essentially parallel to the principal plane of the leaf spring element 11 as a result of a linear advance of the drive 12. Due to the displacement of the fork element 15, the bearing lever 19, which is connected thereto in an articulated fashion, is pivoted about the joint 20. In this way, an effort arm is formed between the joint 20 and the articulated connection between the fork element 15 and the bearing lever 19 such that the angular position of the rear mounting device 9 is adjusted relative to the front mounting device 8, for example, by an angle of more than 3°, preferably more than 5°, especially more than 8°, in particular essentially 10°. For this purpose, the joint 20 between the bearing lever 19 and the front mounting device 8 is essentially arranged in the principal plane of the leaf spring element 11.

Figure 1:
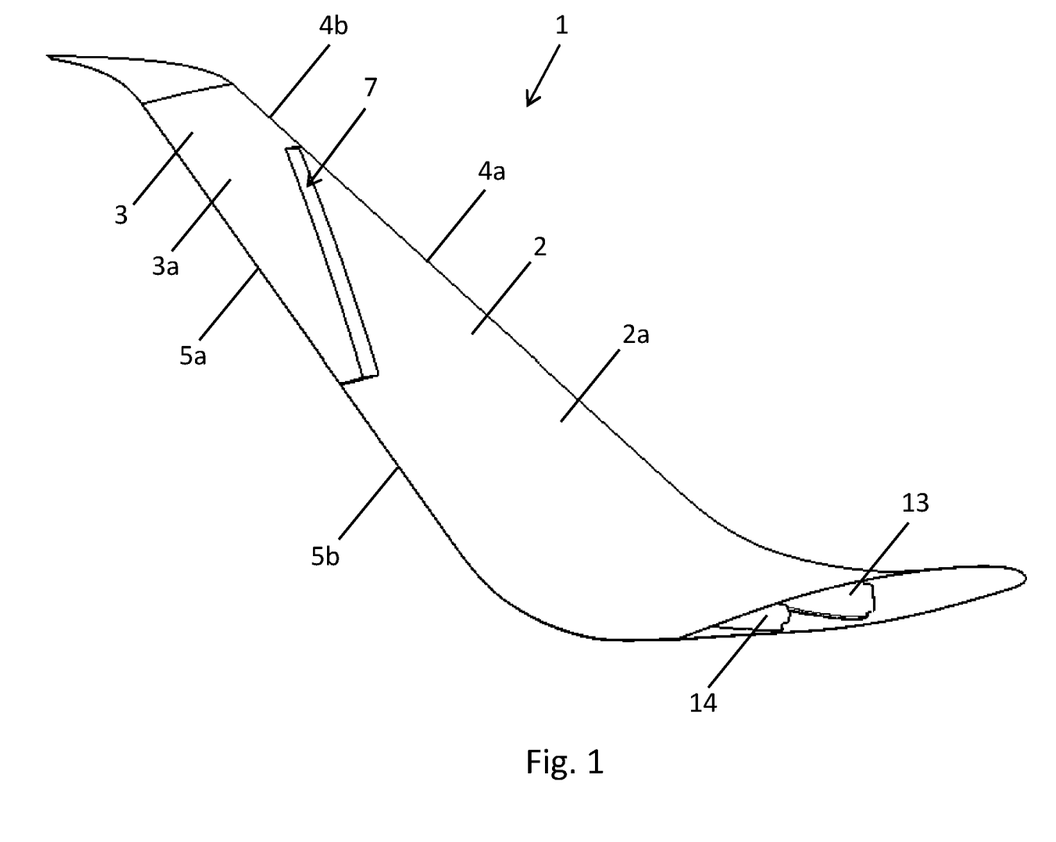
FIG. 1 shows a graphical representation of an inventive profiled body in the form of a winglet for an aircraft, wherein an adjusting unit for adapting the profile geometry of the winglet is arranged between a front profiled element and a rear profiled element.
Figure 2:
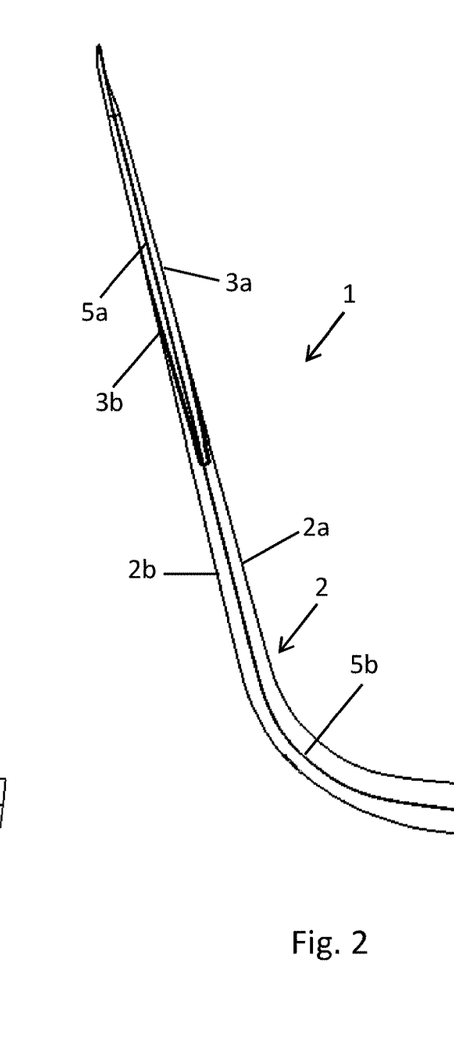
FIG. 2 shows a representation of the winglet in a normal position.
Figure 3:
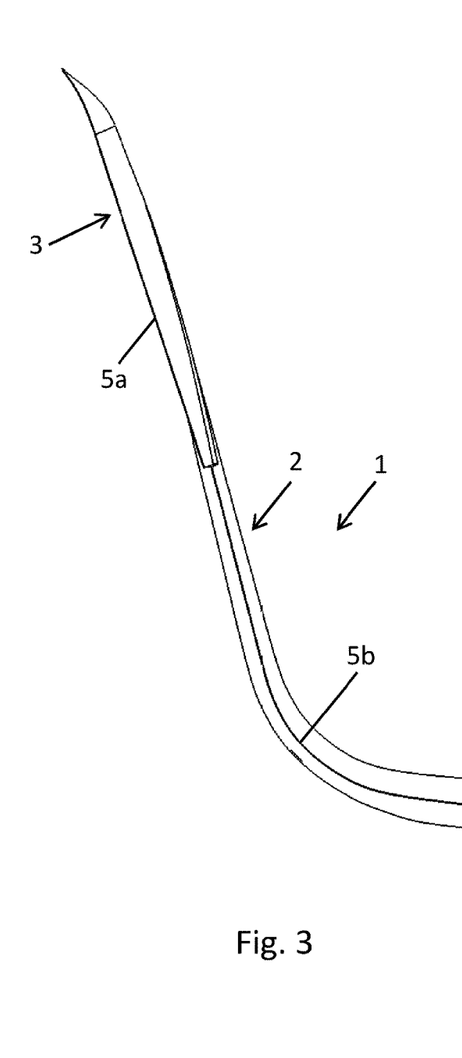
FIG. 3 shows a representation of a winglet according to FIG. 2 in a first active position, in which the rear profiled element is adjusted by −10° referred to the normal position.
Figure 4:
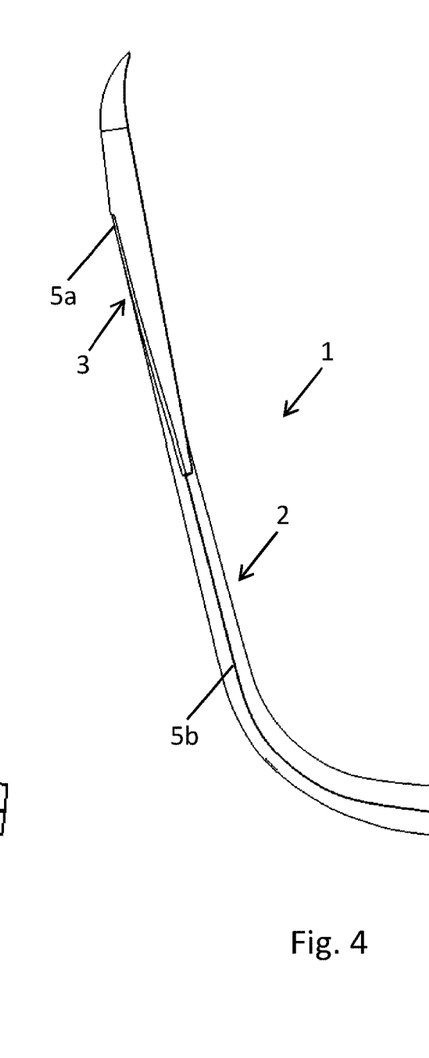
FIG. 4 shows a representation of the winglet according to FIGS. 2, 3 in a second active position, in which the rear profiled element is pivoted by +10° referred to the normal position.
Figure 5:
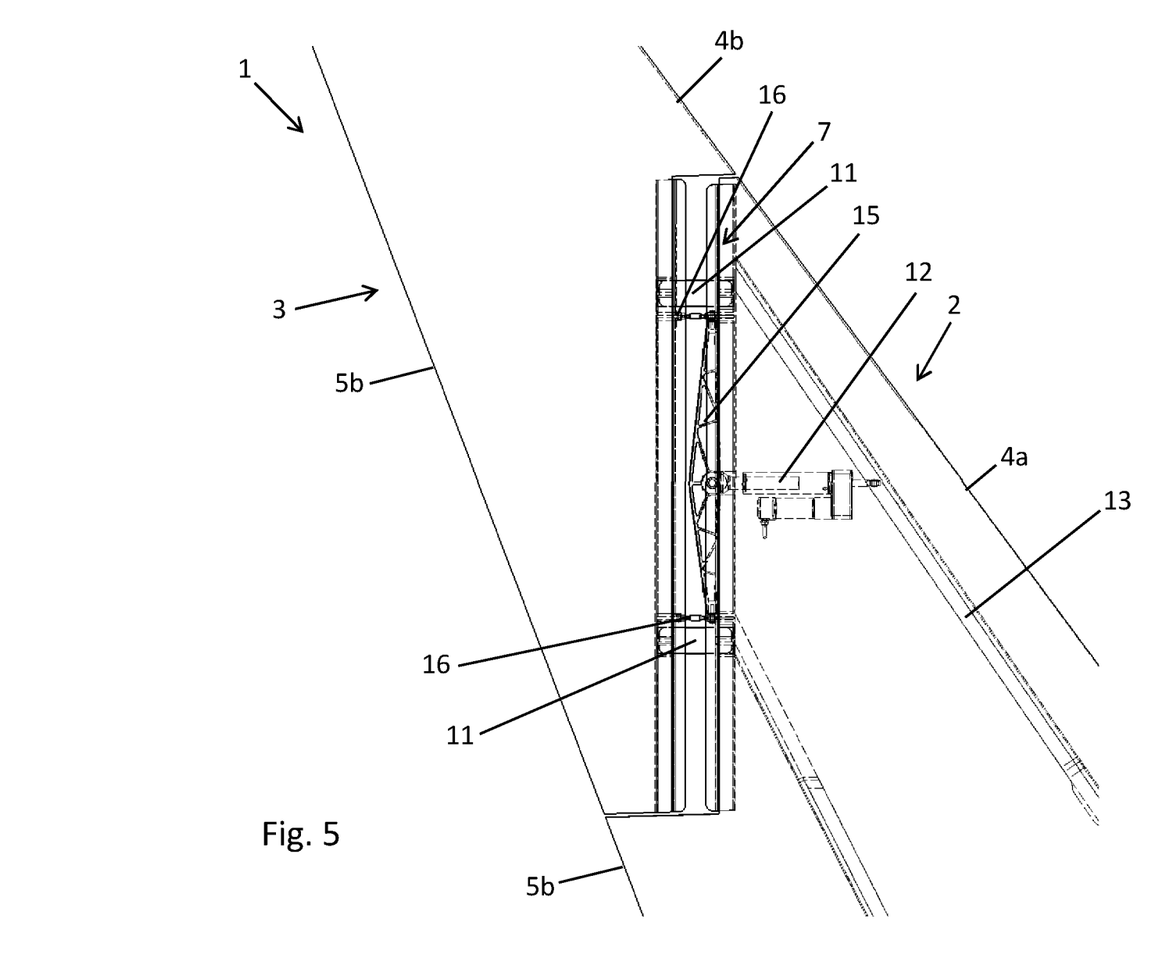
FIG. 5 shows a top view of the winglet in the region of the adjusting unit, the housing of which was omitted in order to provide a better overview.
Figure 6:
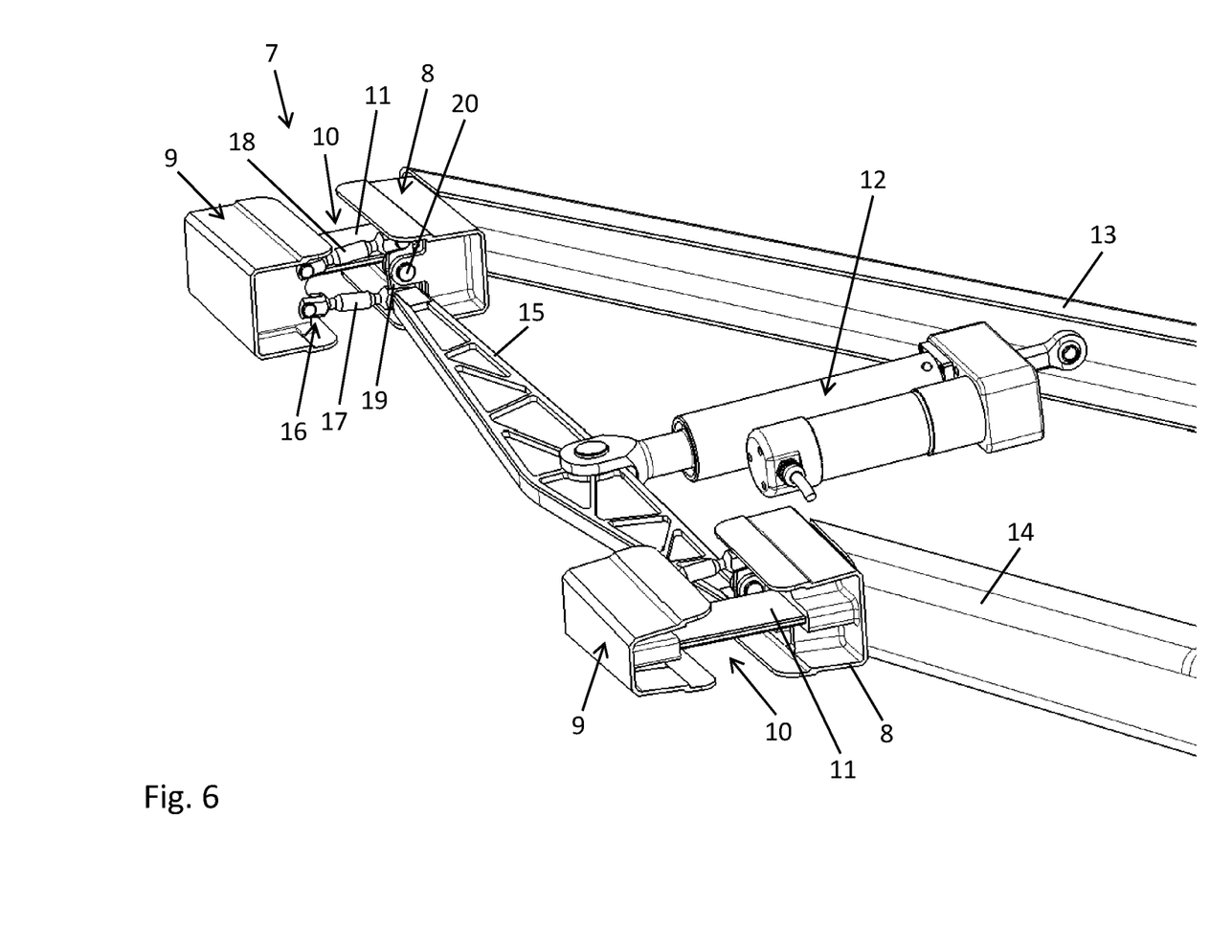
FIG. 6 shows a detailed view of the adjusting unit without housing.
Figure 7:
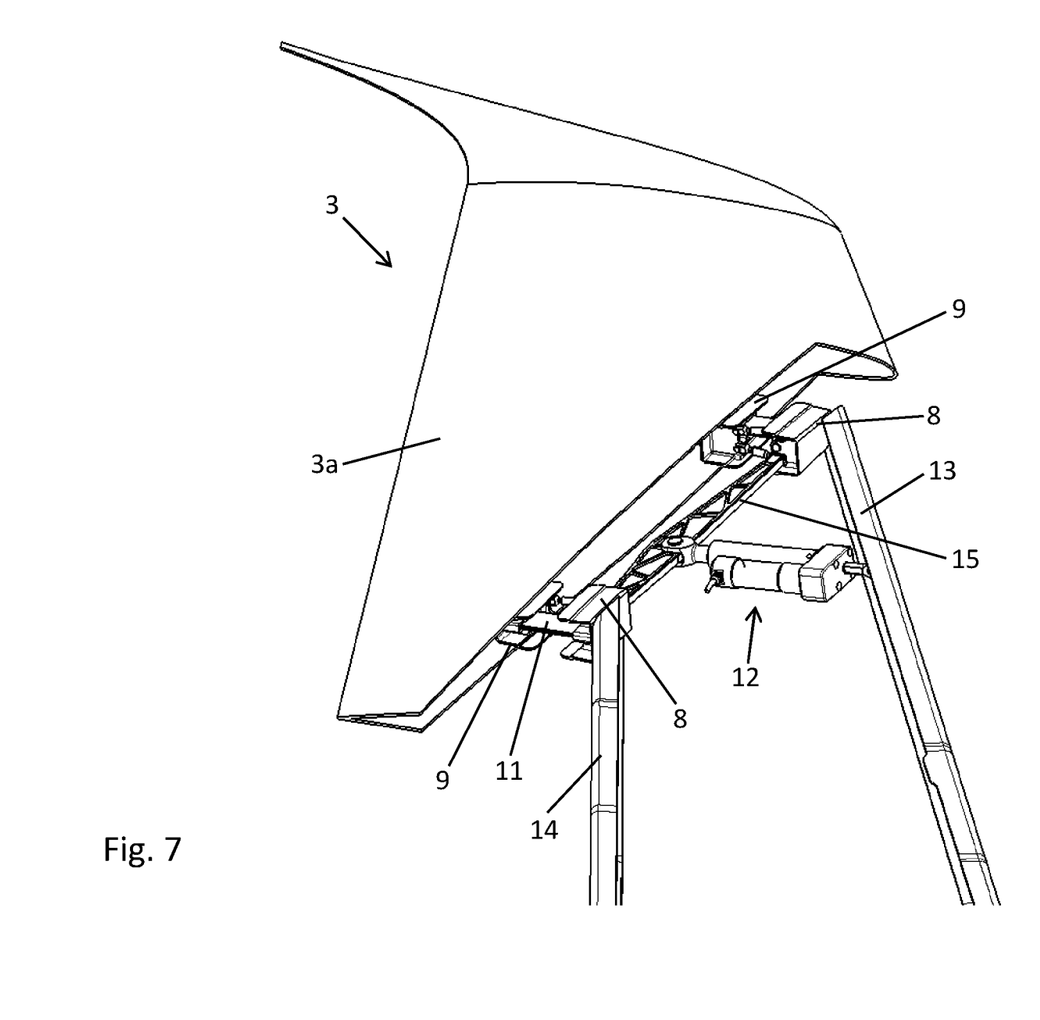
FIG. 7 shows another representation of the adjusting unit without housing in the mounted state on the rear profiled element.
Figure 8:
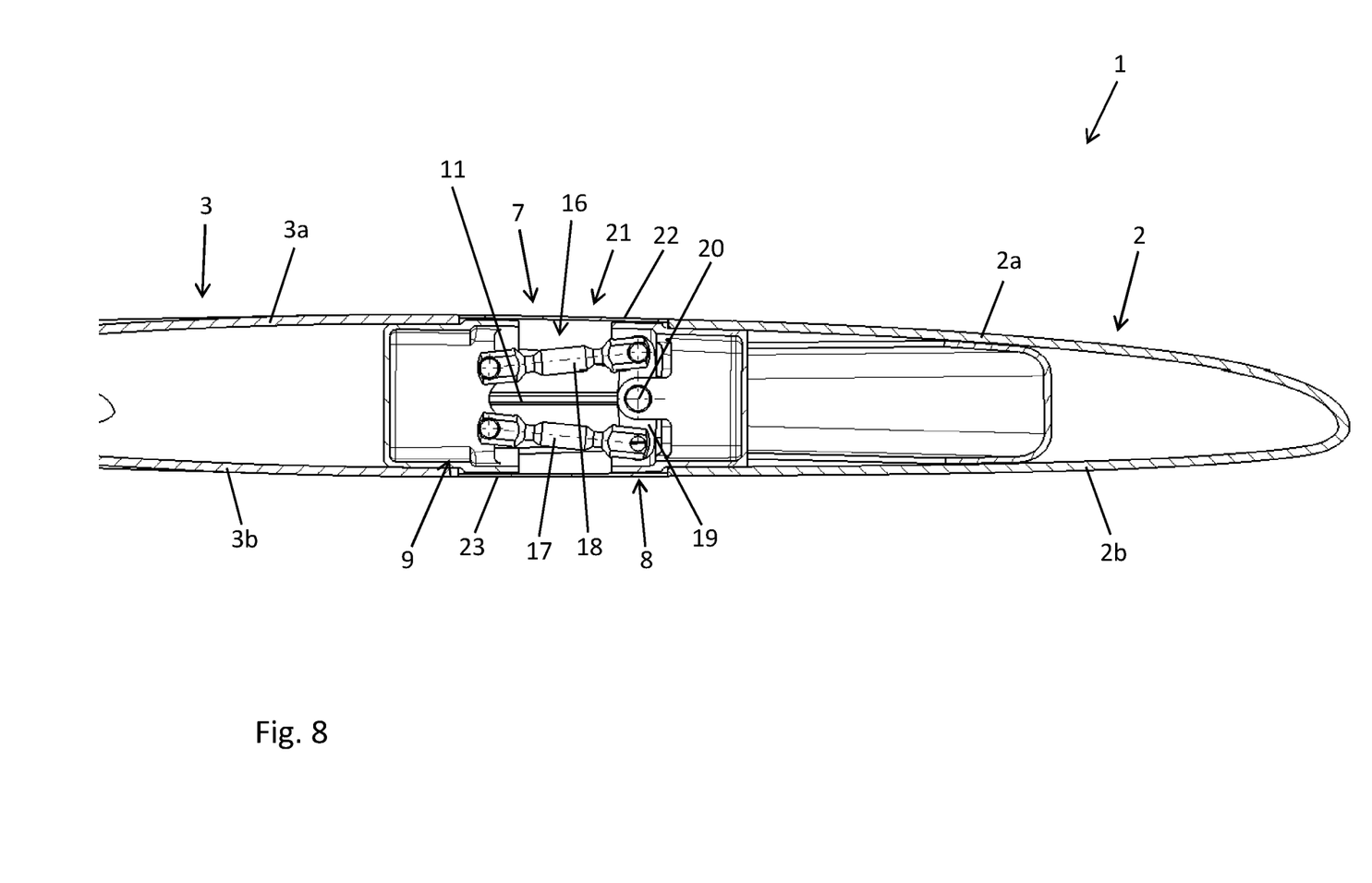
FIG. 8 shows a cross section through the aerodynamic profiled body in the region of the adjusting unit in the normal position according to FIG. 2.
Figure 9:
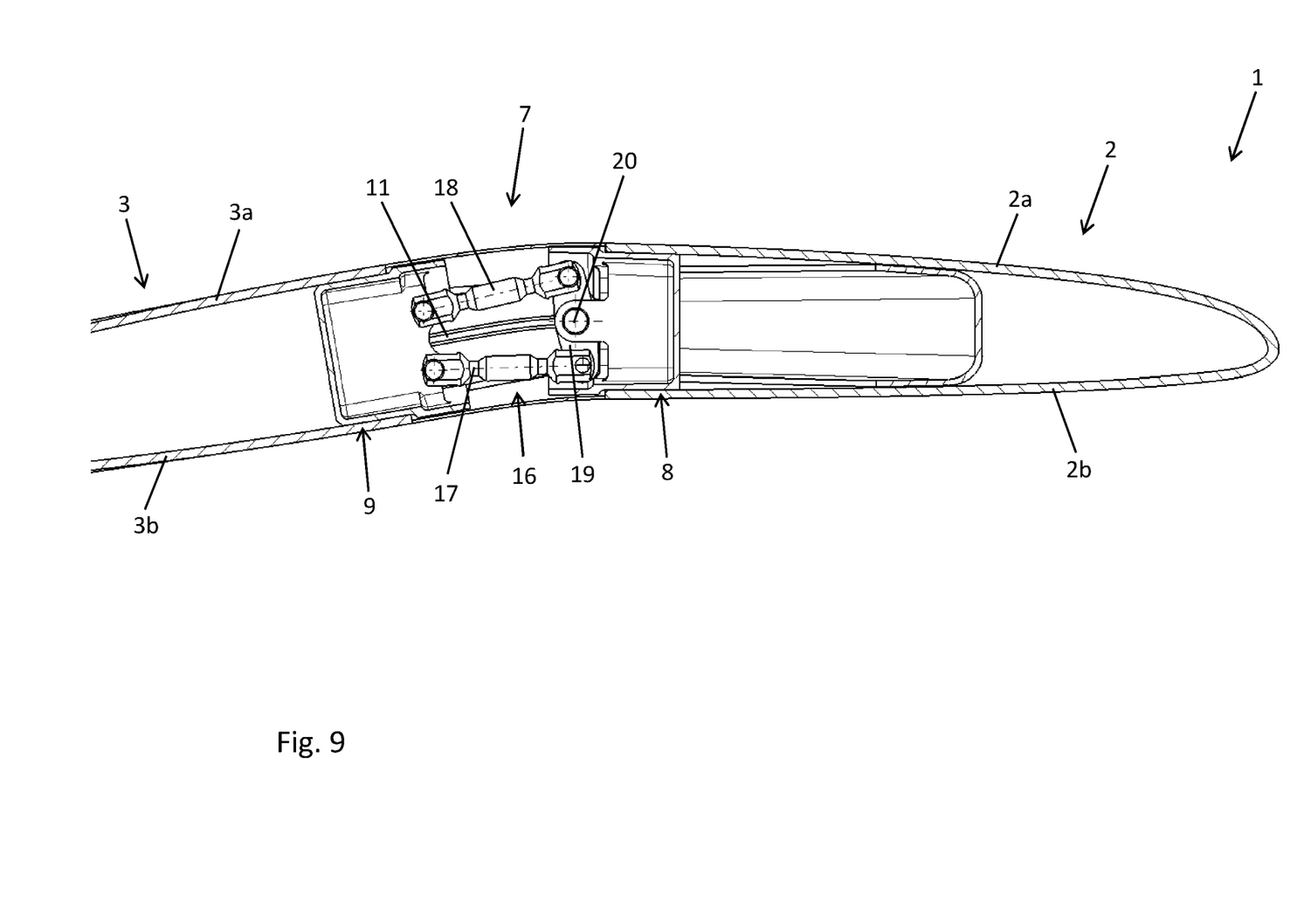
FIG. 9 shows a cross section through the aerodynamic profiled body in the region of the adjusting unit in the first active position according to FIG. 3.
Figure 10:
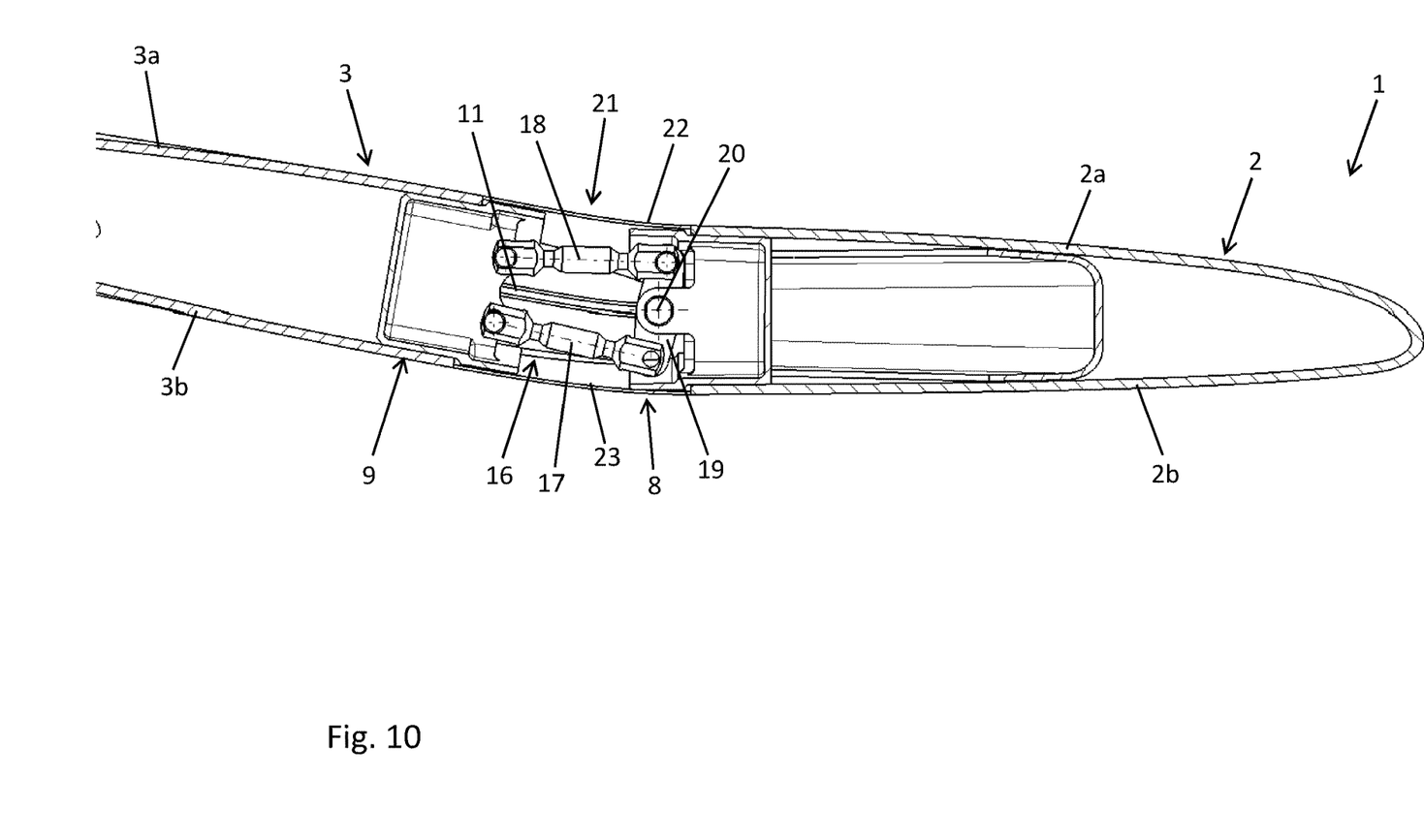
FIG. 10 shows a cross section through the aerodynamic profiled body in the region of the adjusting unit in the second active position according to FIG. 4.

The change in the relative position between the front mounting device 8 and the rear mounting device 9 can be gathered from FIGS. 8-10. According to FIG. 8, the front mounting devices 8 and the rear mounting devices 9 are arranged opposite of one another in pairs and essentially parallel to one another. The leaf spring element 11 is in a relaxed, plane state that corresponds to the normal position of the rear profiled element 3 relative to the front profiled element 2. According to FIG. 9, the rear mounting device 9 is arranged relative to the front mounting device 8 at an angle of essentially 10° such that the profiled body 1 is in the first active position. In this case, the leaf spring element 11 is in a state, in which it is bent open in a direction perpendicular to the principal plane of the leaf spring element 11 in one direction. According to FIG. 10, the rear mounting device 9 is likewise arranged relative to the front mounting device 8 at an angle of 10°, however, referred to the other direction such that the profiled body 1 is in the second active position. In this case, the leaf spring element 11 is in a state, in which it is bent in the other direction open perpendicular to the principal plane of the leaf spring element.

FIGS. 8-10 schematically show that the adjusting unit 7 features a housing with an upper outside surface 22, which essentially ends flush with the profile upper side, and a lower outside surface 23, which essentially ends flush with the profile underside.

The location and direction information such as "top," "bottom," "upward" or "downward" refers to the installed operational state of the aerodynamic profiled body 1, in which the airflow is directed from the profile leading edge 4a, 4b to the profile trailing edge 5a, 5b.

The invention claimed is:

1. An aerodynamic profiled body for an aircraft comprising a front profiled element with a profile leading edge and a rear profiled element with a profile trailing edge, an adjusting unit that connects the front profiled element to the rear profiled element, the rear profiled element being adjustable relative to the front profiled element, wherein the adjusting unit comprises a front mounting device that is connected to the front profiled element, a rear mounting device that is connected to the rear profiled element, and a force-transmitting device that connects the front mounting device and the rear mounting device to one another,
wherein the aerodynamic profiled body is a winglet or a control surface element,
wherein the rear profiled element comprises a free end of the aerodynamic profiled body,
wherein the force-transmitting device comprises an elastically deformable leaf spring element,
wherein the force-transmitting device further comprises a lever mechanism connected to the front mounting device and the rear mounting device for transmitting a torque to the front mounting device or the rear mounting device,
wherein the lever mechanism comprises a first connecting arm and a second connecting arm with first ends of the first and second connecting arms being connected to the front mounting device or the rear mounting device and other ends of the first and second connecting arms being connected to ends of a bearing lever, wherein said bearing lever is respectively mounted on the rear mounting device or the front mounting device, and
wherein the respective connection between the bearing lever and the rear mounting device or the front mounting device is arranged in a principal plane of the leaf spring element.

2. The aerodynamic profiled body according to claim 1, wherein the adjusting unit comprises a drive for transmitting a torque to the elastically deformable leaf spring element.

3. The aerodynamic profiled body according to claim 2, wherein the front mounting device comprises an elongate recess for receiving one end of the leaf spring element and the rear mounting device comprises an elongate recess for receiving an other end of the leaf spring element.

4. The aerodynamic profiled body according to claim 2, wherein the adjusting unit deforms the leaf spring element in a direction perpendicular to the principal plane of the leaf spring element.

5. The aerodynamic profiled body according to claim 4, wherein in a normal position of the rear profiled element the leaf spring element is arranged in a plane relative to the front profiled element, and wherein in an active position of the rear profiled element the leaf spring element is bent open in a direction perpendicular to the principal plane of the leaf spring element.

6. The aerodynamic profiled body according to claim 5, wherein the leaf spring element is arranged centrally between a profile upper side and a profile underside.

7. The aerodynamic profiled body according to claim 6, wherein the leaf spring element is made of fiber-reinforced plastic.

8. The aerodynamic profiled body according to claim 2, wherein the drive is connected to the lever mechanism by a fork element.

9. The aerodynamic profiled body according to claim 8, wherein the drive engages on the connection between the first connecting arm and the bearing lever by means of the fork element.

10. The aerodynamic profiled body according to claim 8, wherein the drive engages the connection between the first connecting arm and the bearing lever by the fork element.

11. The aerodynamic profiled body according to claim 1, further comprising a second front mounting device and a second rear mounting device, wherein the two front mounting devices are provided on the front profiled element and the two rear mounting devices are provided on the rear profiled element, and wherein the force-transmitting device is respectively arranged between each front mounting device and the rear mounting device.

12. The aerodynamic profiled body according to claim 11, wherein a drive is connected to the force-transmitting device by means of a fork element.

13. The aerodynamic profiled body according to claim 1, wherein the adjusting unit comprises a housing with an upper outside surface with terminal ends flush with a profile upper side and a lower outside surface with terminal ends flush with a profile underside.

14. The aerodynamic profiled body according to claim 13, wherein the adjusting unit is separably connected to the front profiled element and the rear profiled element.

15. An aircraft with an aerodynamic profiled body, the aerodynamic profiled body comprising:
a front profiled element with a profile leading edge and a rear profiled element with a profile trailing edge, an adjusting unit that connects the front profiled element to the rear profiled element, the rear profiled element being adjustable relative to the front profiled element, wherein the adjusting unit comprises a front mounting device that is connected to the front profiled element, a rear mounting device that is connected to the rear profiled element, and a force-transmitting device that connects the front mounting device and the rear mounting device to one another,
wherein the aerodynamic profiled body is a winglet or a control surface element,
wherein the rear profiled element comprises a free end of the aerodynamic profiled body,
wherein the force-transmitting device comprises an elastically deformable leaf spring element,
wherein the force-transmitting device further comprises a lever mechanism connected to the front mounting device and the rear mounting device for transmitting a torque to the front mounting device or the rear mounting device,
wherein the lever mechanism comprises a first connecting arm and a second connecting arm with first ends of the first and second connecting arms being connected to the front mounting device or the rear mounting device and other ends of the first and second connecting arms being connected to ends of a bearing lever, wherein said bearing lever is respectively mounted on the rear mounting device or the front mounting device, and
wherein the respective connection between the bearing lever and the rear mounting device or the front mounting device is arranged in a principal plane of the leaf spring element.

* * * * *